United States Patent [19]
Farrow et al.

[11] Patent Number: 6,036,765
[45] Date of Patent: *Mar. 14, 2000

[54] ORGANOCLAY COMPOSITIONS AND METHOD OF PREPARATION

[75] Inventors: Thomas C. Farrow; Chris A. Rasmussen; William R. Menking; David Hugh Durham; Paul W. Carroll, all of Gonzales, Tex.

[73] Assignee: Southern Clay Products, Gonzales, Tex.

[*] Notice: This patent is subject to a terminal disclaimer.

[21] Appl. No.: 09/053,345

[22] Filed: Apr. 1, 1998

[51] Int. Cl.$^7$ .............................. C04B 14/10; C04B 33/04; C09C 1/42
[52] U.S. Cl. .................... 106/487; 106/468; 106/287.17; 106/287.34; 501/148
[58] Field of Search .............................. 501/148; 106/487, 106/468, 287.17, 287.34

[56] References Cited

U.S. PATENT DOCUMENTS

| | | |
|---|---|---|
| 3,804,656 | 4/1974 | Kaliski et al. .......................... 106/487 |
| 3,855,147 | 12/1974 | Granquist . |
| 3,974,125 | 8/1976 | Oswald et al. . |
| 4,081,496 | 3/1978 | Finlayson . |
| 4,105,578 | 8/1978 | Finlayson et al. . |
| 4,314,919 | 2/1982 | Washabaugh et al. . |
| 4,464,274 | 8/1984 | House . |
| 4,473,675 | 9/1984 | Knudson, Jr. et al. . |
| 4,753,974 | 6/1988 | Goodman et al. . |
| 4,810,734 | 3/1989 | Kawasumi et al. . |
| 5,110,501 | 5/1992 | Knudson, Jr. et al. . |
| 5,114,895 | 5/1992 | Holmgren et al. . |
| 5,160,454 | 11/1992 | Knudson, Jr. et al. . |
| 5,334,241 | 8/1994 | Jordan ..................................... 106/487 |
| 5,552,469 | 9/1996 | Beall et al. . |
| 5,554,670 | 9/1996 | Giannelis et al. . |
| 5,616,286 | 4/1997 | Jordan . |
| 5,837,654 | 11/1998 | Carroll et al. .......................... 507/100 |

FOREIGN PATENT DOCUMENTS

| | | |
|---|---|---|
| 221225 | 5/1987 | European Pat. Off. . |
| WO 97/17398 | 5/1997 | WIPO . |

*Primary Examiner*—Michael Marcheschi
*Attorney, Agent, or Firm*—Klauber & Jackson

[57] ABSTRACT

An organoclay composition comprising a mineral clay mixture which has been treated with an alkyl quaternary ammonium salt said mixture comprising: mineral clay (a) comprising 50 to 95 wt. %, based on the weight of the mineral clay mixture, of a mineral clay selected from the group consisting of sepiolite, palygorskite and mixtures of sepiolite and palygorskite; and mineral clay (b) comprising the balance by weight of the mineral clay mixture, of a smectite.

19 Claims, 7 Drawing Sheets

ORGANOCLAY COMPOSITIONS AND METHOD OF PREPARATION

FIELD OF THE INVENTION

This invention relates generally to organophilic clays (hereinafter referred to as "organoclays), and more specifically relates to organoclays prepared from particular mineral clay mixtures which have been treated with alkyl quaternary ammonium compounds. The resultant organoclays are useful as functional additives for organic based systems, where they may confer desired thixotropic properties, or may confer other mechanical or physical properties sought for such systems.

BACKGROUND OF THE INVENTION

Organophilic clays (hereinafter referred to as "organoclays") find wide application as rheological additives in organic based systems. One such system of particular interest for the present invention is based upon an unsaturated polyester. It may be noted in this regard that fumed silica is currently widely used as a direct additive for rheological control of unsaturated polyester resin systems. Organoclays, typically representing the reaction product of a smectite-type clay with a quaternary ammonium compound, have also been used for these purposes, but normally require a pregel of the organoclay in styrene for proper viscosity development prior to addition to the resin system. This is discussed in numerous prior art patents, e.g. in U.S. Pat. Nos. 4,473,675 and 4,240,951.

Various producers of organoclays have had limited success preparing direct add organoclays which do not require a pregel with an unsaturated polyester resin/styrene system, see for example U.S. Pat. No. 4,753,974. By and large, however, these prior efforts have not produced a product which is broadly competitive with fumed silica.

Another field pertinent to the present invention where the thixotropic properties of organoclays are of importance is drilling fluids. In the course of drilling an oil, gas or water well by means of rotary drilling tools, the drill pipe and bit are rotated to drill out the borehole. A so-called "drilling fluid" or "drilling mud" is circulated downwardly through the hollow drill stem and bit to the bottom of the borehole and then upwardly through the surface through the annular space between the drill stem and the interior of the borehole. This drilling fluid comprises a suspension of solid material in a liquid medium and may contain other added agents. The drilling fluid lubricates and cools the drill bit, and suspends and carries cuttings out of the borehole. In order to perform these and other functions the drilling fluid should desirably have certain physical characteristics. These include a viscosity that enables it to be pumped and circulated. Also the fluid should have sufficient gel strength that cuttings will remain suspended in the borehole if circulation of the fluid is stopped, as for example by a mechanical failure.

In those instances where the drilling fluid has an oil base, organoclays have long been used as thickeners and/or suspending agents. These organoclays, representing the reaction product of a smectite-type clay with a quaternary ammonium compound, are well-known in the art and are disclosed in numerous U.S. patents such as U.S. Pat. Nos. 4,105,578, 4,569,923 and 4,664,842. The drilling fluids of the prior art which incorporate these organoclays have provided satisfactory performance under relatively moderate operating temperatures. However where drilling temperatures begin to exceed around 300° F. conventional organoclays other than those based on hectorite begin to perform poorly. Particularly in the higher range extending to 450–550° F. or higher, these conventional drilling fluids (including those based on hectorite organoclays) have displayed an undesirable loss in viscosity and gel strength.

In addition to their functions as thixotropes, organoclays find numerous other applications. Recently, e.g. processes have been disclosed which are useful in producing composite materials composed of a organic polymer and a smectite-type clay mineral, with the mineral being connected to the polymer through ionic bonding. For example, in Kawasumi et al., U.S. Pat. No. 4,810,734 a process is disclosed wherein a smectite-type clay mineral is contacted with a swelling agent in the presence of a dispersion medium thereby forming a complex. The complex containing the dispersion medium is mixed with a monomer, and the monomer is then polymerized. The patent states that the swelling agent acts to expand the interlayer distance of the clay mineral, thereby permitting the clay mineral to take monomers into the interlayer space. The swelling agent is a compound having a onium ion and a functional ion capable of reacting and bonding with a polymer compound. Among the polymers utilizable are polyamide resins, vinyl polymers, thermosetting resins, polyester resins, polyamide resins and the like. Related disclosures are found in U.S. Pat. Nos. 4,739,007 and 4,889,885.

The swelling agents used in the Karasumi et al. and related patents cited above, technically qualify as organoclays. In general, organoclays represent the reaction product of a smectite-type clay with a higher alkyl containing ammonium compound (often a quaternary), and have long been known for use in gelling of organic liquids such as lubricating oils, linseed oil, toluene and the like and for use as rheological additives in a variety of organic based liquid systems and solvents. The general procedures and chemical reactions pursuant to which these organoclays are prepared are well known. Thus under appropriate conditions the organic compound which contains a cation will react by ion exchange with clays which contain a negative layer lattice and exchangeable cations to form the organoclay products. If the organic cation contains at least one alkyl group containing at least ten carbon atoms then the resultant organoclays will have the property of swelling in certain organic liquids. Among the further prior art patents which discuss at length aspects of the preparation and properties of organoclays are U.S. Pat. Nos. 2,531,427, 2,966,506, 3,974, 125, 3,537,994, and 4,081,496.

As utilized in the present specification, the term "smectite" or "smectite-type clays" refers to the general class of clay minerals with expanding crystal lattices, with the exception of vermiculite. This includes the dioctahedral smectites which consist of montmorillonite, beidellite, and nontronite, and to the trioctahedral smectites, which includes saponite, hectorite, and sauconite. Also encompassed are smectite-clays prepared synthetically, e.g. by hydrothermal processes as disclosed in U.S. Pat. Nos. 3,252,757; 3,586, 468; 3,666,407; 3,671,190; 3,844,978; 3,844,979; 3,852, 405; and 3,855,147.

The phase dispersions exhibited by the composite materials thus far discussed are relatively coarse, and differ materially in this respect from nanocomposites. The latter are a relatively new class of materials which exhibit ultrafine phase dimensions, typically in the range 1–100 nm. Experimental work on these materials has generally shown that virtually all types and classes of nanocomposites lead to new and improved properties when compared to their micro- and macrocomposite counterparts. The number of nanocomposites based on smectite-type clays and linear thermoplastics is growing. Wang and Pinnavaia, e.g., have recently reported delamination of an organically modified smectite in an epoxy resin by heating an onium ion exchanged form of montmorillonite with epoxy resin to temperatures of 200–300° C. *Chemistry of Materials,* vol. 6, pages 468–474 (April, 1994). Moreover in U.S. Pat. No. 5,554,670 an epoxy-silicate nanocomposite is disclosed which is prepared by dispersing an organically modified smectite-type clay in an epoxy resin together with diglycidyl ether of bisphenol-A (DGEBA), and curing in the presence of either nadic methyl anhydride (NMA), and/or benzyldimethyl amine (BDMA), and/or boron trifluoride monoethylamine (BTFA) at 100–200° C. Molecular dispersion of the layered silicate within the crosslinked epoxy matrix is obtained, with smectite layer spacings of 100 Å or more and good wetting of the silicate surface by the epoxy matrix. Additional recent references evidencing the increasing interest in nanocomposites incorporating organoclays in polymer matrices include U.S. Pat. Nos. 5,164,440; 5,385,776; 5,552,469; and 5,578,672;

SUMMARY OF THE INVENTION

Now in accordance with the present invention, it has unexpectedly been discovered that combinations of certain clay minerals may be reacted with quaternary ammonium compounds to provide organoclay compositions which are possessed of remarkable properties rendering them highly useful in a variety of applications, including but not limited to those discussed above.

DETAILED DESCRIPTION OF THE INVENTION

The organoclay compositions of the invention comprise mineral clay mixtures which have been treated with alkyl quaternary ammonium compounds. Such mineral clay mixtures in turn comprise: mineral clay (a) comprising 50 to 95 wt. %, based on the weight of the mineral clay mixture, of a mineral clay selected from the group consisting of sepiolite, palygorskite and mixtures of sepiolite and palygorskite; and mineral clay (b) comprising the balance by weight of the mineral clay mixture, of a smectite. Preferably, mineral clay (a) is present in an amount of 60 to 95 wt. %, especially 70 to 90 wt. %, based on the weight of the mineral clay mixture.

Of the two mentioned phyllosilicates, sepiolite is preferred for use in the invention. Both sepiolite and palygorskite are included in the phyllosilicates because they contain a continuous two-dimensional tetrahedral sheet of composition $T_2O_5$ (T=Si, Al, Be, ...) but they differ from the other layer silicates in lacking continuous octahedral sheets. Further details of the structures of these minerals, including the structural distinctions between the two, may be found in B. F. Jones and E. Galan "Sepiolite and Palygorskite", Chapter 16 of *Hydrous Phyllosilicates, Reviews in Mineralogy,* Volume 19, (Mineralogical Society of America, Washington, D.C., 1988).

Preferably, the smectite is a natural or synthetic clay mineral selected from the group consisting of hectorite, montmorillonite, bentonite, beidelite, saponite, stevensite and mixtures thereof. A particularly preferred choice of the smectite is hectorite.

In a preferable procedure for preparing the organoclay composition, the sepiolite and/or palygorskite is crushed, ground, slurried in water and screened to remove grit and other impurities. The smectite mineral is subjected to a similar regimen. Each of the component minerals is then subjected as a dilute (1 to 6 %solids) aqueous slurry to high shearing in a suitable mill. Most preferred for use in this shearing step is a homogenizing mill of the type wherein high speed fluid shear of the slurry is effected by passing the slurry at high velocities through a narrow gap, across which a high pressure differential is maintained. This type of action can e.g. be effected in the well-known Manton-Gaulin "MG") mill, which device is sometimes referred to as the "Gaulin homogenizer". Reference may be made to commonly assigned U.S. Pat. Nos. 4,664,842 and 5,110,501 for further details of such mill. The conditions for use of the MG mill may in the present instance be substantially as in the said patents; e.g. the said pressure differential across the gap is preferably in the range of from 70,300 to 562,400 g/cm$^2$ with 140,600 to 351,550 g/cm$^2$ being more typical in representative operations. Depending upon the specifics of the equipment, pressures higher than 562,400 g/cm$^2$ can readily be used. The slurry to be treated may be passed one or more times through the MG mill.

Among additional instrumentalities which can be effectively utilized in the present invention to provide high shearing of the clay components, is the rotor and stator arrangement described in commonly assigned U.S. Pat. No. 5,160,454. The use of high shear in the present invention is not only important in providing the benefits for the smectite which are discussed in the foregoing patents; but moreover in the instances of the sepiolite and/or palygorskite, such high shearing acts to "debundle" the otherwise "bundled" type of structures which exist in the latter minerals. It is this debundling action which in part is believed to be instrumental in yielding the results achieved in the present invention.

Following the high shear step, the clay components slurries may be mixed with one another. Alternatively, the two or more clay components can be intermixed in a single slurry before the latter is subjected to the high shear step. Following such step the single slurry is intermixed with the alkyl quaternary ammonium salt, after which the slurry is dewatered, and the alkyl quaternary ammonium-treated clay dried and ground to provide a dry organoclay product.

The organoclay products of the invention are found to display unexpected and highly desirable properties when used as a thixotrope in various organic based systems. When used in the gelling of an unsaturated polyester resin, it is thus found that the composition can be stirred and dispersed directly in an unsaturated polyester resin/monomer solution, and will provide highly satisfactory gelling properties. The unsaturated polyester resin composition comprises a solution of an unsaturated polyester resin in a monomer which is capable of undergoing a crosslinking reaction with the resin and the mineral clay mixture described above. Suitable monomers for the unsaturated polyester resin are unsaturated aromatic compounds to which are bonded one or more ethylenically unsaturated radicals, such as a vinyl radical, substituted vinyl radical or an allylic radical, e.g. styrene (which is preferred), α-methylstyrene, divinyl benzene, allyl benzene and methyl methacrylate.

The unsaturated polyester resins may be any of those known in the prior art. Suitable examples are polyesters of dienes such as dicyclopentadiene as well as polyesters of dicarboxylic acids and diols having a major amount of olefinic unsaturation, preferably 10 to 75 olefinic groups per 100 ester groups. The olefinic unsaturation is preferably derived from the carboxylic acid although the diol may also be unsaturated. Typical diols are ethylene glycol and propylene glycol. Typical unsaturated acids include maleic acid, fumaric acid and phthalic acid or anhydrides of these acids. Such polyester resins are made by conventional techniques of esterification. Generally, polyester resins having weight average molecular weights of about 400 to 10,000 and acid numbers in the range of from 35 to 45 mg KOH per gram of resin are useful for preparing the polyester compositions.

The amount of the unsaturated polyester resin in the final polyester composition is typically at least about 30 wt. %, based on the weight of the composition, with the balance being the monomer, the treated mineral clay mixture (i.e. the thixotrope), primary pigment, fillers, reinforcement fibers and additives (e.g. promoters, catalyst, dispersants, etc).

The alkyl quaternary ammonium-treated mineral clay mixture of the invention is generally employed in the unsaturated polyester resin system in an amount such that the final unsaturated polyester composition will have a flow curve which allows application but prevents drainage from or sag of the material from the surface to which the unsaturated polyester composition is applied. The proper thixotropic index will depend on the intended end use of the unsaturated polyester composition and the manner in which the thixotropic index is measured. In general, the unsaturated polyester composition will typically have a thixotropic index of at least about 1.5, preferably at least about 3.0. Generally, the amount of the alkyl quaternary ammonium-treated mineral clay mixture will be about 0.1 to 4 wt. %, based on the weight of the final polyester composition.

Similarly the organoclay compositions of the invention yield surprising results when utilized in high temperature drilling fluids. By use of such additives an oil base environmentally benign drilling fluid composition is provided which has a stable high viscosity and high gel strength at use temperatures up to at least 450° F. The drilling fluid comprises a low toxicity biodegradable oil vehicle, and as a viscosifying agent, an organoclay of the invention. The drilling fluids so formulate on are found to have a yield point of at least 50 lbs/100 ft$^2$ of drill pipe area.

When used in composites such as nanocomposites, the organoclay compositions of the invention yield unexpected improvements in the mechanical and other properties of the composite, including with respect to tensile strength, tensile modulus and flex modulus, all of which are highly significant attributes for the plastics and similar formulators.

The alkyl quaternary ammonium salts employed for treating the mineral clay mixtures comprise alkyl quaternary ammonium salts containing the same or different straight- and/or branched-chain saturated and/or unsaturated alkyl groups of 1 to 22 carbon atoms and the salt moiety is selected from the group consisting of chloride, bromide, methylsulfate, nitrate, hydroxide, acetate. phosphate and mixtures thereof, preferably chloride, bromide and methylsulfate. The preferred choices of the alkyl quaternary ammonium salts are dimethyl di(hydrogenated tallow) ammonium chloride, methylbenzyl di(hydrogenated tallow) ammonium chloride, dimethylbenzyl hydrogenated tallow ammonium chloride, dimethyl hydrogenated tallow-2-ethylhexylammonium methylsulfate and mixtures of two or more of the preferred choices. The mineral clay mixture is typically treated with 5 to 80 meq. of the alkyl quaternary ammonium salt per 100 g of the mixture. Where the organoclay is used in high temperature drilling fluids a more preferred range is 5 to 50 meq., and even more optimal, 10 to 35 meq of the alkyl quaternary ammonium salt per 100 g of the mixture. For many other thixotropic applications a range of about 25 to 80, and preferably 35 to 65 meq., of the alkyl quaternary ammonium salt is used per 100 g of the clay mixture.

Where utilized in high temperature drilling fluids, the oil vehicle utilized with the organoclays is one which is environmentally benign, by which is meant that the oil is one that over a reasonable course of time will biodegrade in the ground into relatively harmless products. Oils of this type are well known for use in drilling fluids and similar applications, and are commonly a hydrotreated light distillate. The resultant product contains minimal, if any quantities of aromatic components, and mostly short chain hydrocarbons. The LTV oil of Conoco and the Low Toxicity Drilling Mud Oil of Exxon are commercial examples of such products. Synthesized biodegradable oils based on alpha olefins or the like are also acceptable for the present use.

In addition to containing preferably from about 4 to 6 lbs/barrel of the organoclay viscosifying agent that will be further discussed below, the drilling fluids may contain conventional additives such as emulsifying agents, and fillers such as barium sulfate. As used herein the term "barrel" refers to that volume which is standard in oil field practice and contains 42 U.S. gallons.

The organoclays of the invention can be used in preparing nanocomposites by any of the methods which are set forth in the prior referenced patents, and with a large variety of polymerizable resins such as polyamides, epoxy, polyvinyl, polyacrylamide, etc.

The invention will now be illustrated by examples, which are to be regarded as illustrative and not delimitative of the invention. Unless otherwise indicated to the contrary, all parts and percentages are by weight.

EXAMPLE 1

A series of organoclay compositions were prepared from mineral clay combinations which were processed as above described, i.e. crushed, ground, slurried in water and screened, and then subjected to high shear by being passed as a dilute slurry through an MG mill, and then as a single slurry treated with the alkyl quaternary ammonium compounds as specified below. The resultant organoclay compositions were evaluated as thixotropes in an isophthalic unsaturated polyester resin/styrene system having a 55% resin and a 45% styrene content. 1.5 g of fumed silica (used as the control thixotrope and containing no alkyl quaternary ammonium compound) was mixed with about 140 g of the resin/styrene system on a laboratory disperser with a tip speed of approximately 1000 ft/minute for 15 minutes. A cobalt gellation promoter was added at 0.25 wt. % of the resin weight. The promoter was a mixture of 8 parts of cobalt octoate to 1 part of dimethyl aniline. The sample was then shaken on a paint shaker for 45 seconds. The above procedure was repeated with 2.3 g of the organoclay compositions. Brookfield viscosities were measured in centipoise at one hour. The thixotropic index ("TI") is the ratio of viscosities at 10 and 100 rpm. The results are shown in Table I below.

TABLE I

| Mineral Clay Combinations | Viscosities, cps. RPM | | | |
|---|---|---|---|---|
| Quaternary Ammonium Compound | 1 | 10 | 100 | TI |
| 1. Fumed Silica | 6500 | 1600 | 650 | 2.46 |
| 2. 80% sepiolite/20% hectorite 60 meq. 50% DMHTEHAMS/50% DMDHTAC | 5000 | 1400 | 620 | 2.28 |
| 3. 70% palygorskite/30% montmorillonite 60 meq. DMBHTAC | 1500 | 700 | 475 | 1.47 |
| 4. 100% montmorillonite 120 meq. 75% DMDHTAC/25% DMBHTAC | 500 | 400 | 400 | 1.00 |
| 5. 100% sepiolite 60 meq. 50% DMHTEHAMS/50% DMDHTAC | 1500 | 800 | 500 | 1.70 |
| 6. 75% sepiolite/25% montmorillonite 60 meq. DMBHTAC | 2000 | 900 | 530 | 1.70 | meq. = milliequivalents; DMHTEHAMS = dimethyl hydrogenated tallow-2-ethylhexylammonium methylsulfate; DMDHTAC = dimethyl di(hydrogenated tallow) ammonium chloride; MBDHTAC = methylbenzyl di(hydrogenated tallow) ammonium chloride; DMBHTAC = dimethylbenzyl hydrogenated tallow ammonium chloride.

EXAMPLE 2

Example 1 was repeated using an orthophthalic unsaturated polyester resin/styrene system having a 60% resin and a 40% styrene content. The thixotropes were loaded at 1 wt. %, based on the weight of the total composition. The results are shown in Table II below.

TABLE II

| Mineral Clay Combinations | Viscosities, cps. RPM | | | |
|---|---|---|---|---|
| Quaternary Ammonium Compound | 1 | 10 | 100 | TI |
| 7. 67% sepiolite/33% hectorite 69 meq. DMBHTAC | 7000 | 1350 | 530 | 2.58 |
| 8. 67% sepiolite/33% hectorite 63 meq. DMBHTAC | 10000 | 1900 | 670 | 2.84 |
| 9. Fumed Silica | 11000 | 2300 | 750 | 3.06 |

EXAMPLE 3

Example 1 was repeated using a dicyclopentadiene polyester resin/styrene system having a 63% resin and a 37% styrene content. The thixotropes were loaded at 1.5%, based on the weight of the total composition. The results are shown in Table III below.

TABLE III

| Mineral Clay Combinations | Viscosities, cps. RPM | | | |
|---|---|---|---|---|
| Quaternary Ammonium Compound | 1 | 10 | 100 | TI |
| 10. 100% sepiolite 30 meq. 50% DMHTEHAMS/50% DMDHTAC | 1000 | 400 | 255 | 1.56 |
| 11. 80% sepiolite/20% hectorite 60 meq. 50% DMHTEHAMS/50% DMDHTAC | 8000 | 1650 | 495 | 3.33 |
| 12. Fumed Silica | 2000 | 650 | 330 | 1.97 |

EXAMPLE 4

The samples employed in this example were prepared in the following manner. Each sample was prepared by dispersing the crude sepiolite with a COWLES DISSOLVER homogenizing mill into a slurry form of 2–10 wt. % solids, screened at 100 mesh/2.5 cm to remove contaminants and thereafter subjected to one pass through the MG mill at 105,460 g/cm$^2$.

Each sample was reacted with the indicated alkyl quaternary ammonium compound and indicated dosage by adding the compound to the slurry with mixing at 40–80° C. The sample was thereafter dried in a blower oven at 60–80° C. overnight and pulverized using a PULVAZET MILL pulverizer.

Mineral clay sample 13 consisted of sepiolite treated with 45 meq. of 75% MBDHTAC/25% DMDHTAC and was prepared as described above.

Mineral clay sample 14 was prepared as described in respect to mineral clay sample 13 except that it was treated with an ion exchange resin (sodium form) after passage through the MG mill but prior to treatment with the alkyl quaternary ammonium compound.

Mineral clay sample 15 consisted of 80% sepiolite/20% montmorillonite treated with 55 meq. of 75% MBDHTAC/25% DMDHTAC and was prepared as described above with the addition of 20% montmorillonite as a slurry at approximately 3% solids. The 20% montmorillonite was passed through the MG mill three times at 316,395 g/cm$^2$ and added to the sepiolite slurry after the sepiolite slurry passed through the MG mill, but prior to treatment with the alkyl quaternary ammonium compound 50 meq. of hydrochloric acid were added to the combined slurries prior to treatment with the alkyl quaternary ammonium compound.

Mineral clay sample 16 consisted of 80% sepiolite/20% hectorite treated with 55 meq. of 75% MBDHTAC/25% DMDHTAC and was prepared as described above with the addition of 20% hectorite as a slurry at approximately 3% solids. The 20% hectorite was passed through the MG mill three times at 210,930 g/cm$^2$ and added to the sepiolite slurry after the sepiolite slurry passed through the MG mill, but prior to treatment with the alkyl quaternary ammonium compound. 50 meq. of hydrochloric acid were added to the combined slurries prior to treatment with the alkyl quaternary ammonium compound.

Mineral clay sample 17 was prepared in the same manner as mineral clay sample 16 except that the sepiolite portion of the blend was treated with an ion exchange resin (sodium form) after passage through the MG mill but prior to blending and treatment with the alkyl quaternary ammonium compound.

Sample 18 was fumed silica.

Unsaturated polyester resin compositions consist of the resin, monomer, promoter/accelerator, inhibitor, thixotrope wetting agents and/or surfactants or Theological enhancers, and the organoclay composition of the invention. The end user will add the catalyst to cure or crosslink the composition.

There are many different types of unsaturated polyester resins of which three types are set forth in Table IV. There are also many different types of monomers. Styrene is commonly used but others such as methyl methacrylate, paramethylstyrene, vinyl toluene and others have been used. The typical promoter is a cobalt compound such as cobalt octoate or cobalt naphthenate, but other materials such as rare earth metal compounds may also be used. Typical accelerators are dimethylaniline and diethylaniline. Typical inhibitors are hydroquinone and tertiarybutylcatechol. There are many types of thixotrope wetting agents/surfactants/rheological such as "TWEEN 20" which is polyoxyethylene (20) sorbitan monolaurate.

The isophthalic unsaturated polyester resin system was evaluated by mixing 100 g of resin, 30 g styrene and 2.8 g mineral clay thixotrope for 15 minutes at 3800 rpm on a "Dispersamat". 130 g of resin and 20 g styrene were added to the mixture and mixing was continued for 2 minutes at 2200 rpm. "TWEEN 20" was added at 7% by weight of the thixotrope and mixed for 2 minutes at 2200 rpm. A solution containing 6% cobalt octoate was mixed with dimethylaniline at an 8:1 ratio and was added at an amount of 0.05 wt. %, based on the weight of the entire composition, and mixed for 1 minute at 2200 rpm. The samples were cooled to room temperature over a 1-hour period and viscosities were measured using a Brookfield RVT viscometer at 1, 10 and 100 rpm.

The orthophthalic unsaturated polyester resin system was evaluated by mixing 150 g resin, 14 g styrene and 2.5 g mineral clay thixotrope for 12 minutes at 3800 rpm on a "DISPERSAMAT". 62 g resin, 25 g styrene and 7% by weight of the thixotrope of "TWEEN 20" were added to the mixture and mixing was continued for 2 minutes at 2000 rpm. A solution containing 6% cobalt octoate was mixed with dimethylaniline at an 8:1 ratio and was added at an amount of 0.05 wt. %, based on the weight of the entire composition, and mixed for 1 minute at 2200 rpm. The samples were cooled to room temperature over a 1-hour period and viscosities were measured using a Brookfield RVT viscometer at 1, 10 and 100 rpm.

The dicyclopentadiene unsaturated polyester resin system was evaluated by mixing 150 g resin and 2.5 g mineral clay thixotrope for 12 minutes at 3800 rpm on a "DISPERSA-MAT". Thereafter, 7% by weight of the thixotrope of "TWEEN 20" was added to the mixture and mixing was continued for 1 minute at 2000 rpm Then 64.3 g resin, 35.7 g styrene and a solution containing 6% cobalt octoate was mixed with dimethylaniline at an 8:1 ratio and was added at an amount of 0.05 wt. %, based on the weight of the entire composition, and mixed for 1 minute at 2200 rpm The samples were cooled to room temperature over a 1-hour period and viscosities were measured using a Brookfield RVT viscometer at 1, 10 and 100 rpm. The results are set forth in Table IV below.

TABLE IV

| | Isophthalic Viscosities, cps. | | | | Orthophthalic Viscosities, cps. | | | | Dicyclopentadiene Viscosities, cps. | | | |
|---|---|---|---|---|---|---|---|---|---|---|---|---|
| Sample | 1 | 10 | 100 | TI | 1 | 10 | 100 | TI | 1 | 10 | 100 | TI |
| 13 | 9500 | 1450 | 395 | 3.67 | 5000 | 950 | 350 | 2.71 | 4000 | 600 | 150 | 4.00 |
| 14 | 10500 | 1550 | 455 | 3.41 | 6000 | 1100 | 385 | 2.86 | 3500 | 550 | 140 | 3.93 |
| 15 | 8500 | 1450 | 450 | 3.22 | 5000 | 900 | 365 | 2.47 | 3500 | 550 | 140 | 3.93 |
| 16 | 18500 | 2650 | 605 | 4.38 | 9000 | 1550 | 495 | 3.13 | 8500 | 1150 | 230 | 5.00 |
| 17 | 15500 | 2250 | 560 | 4.02 | 11500 | 1750 | 515 | 3.40 | 5500 | 800 | 180 | 4.44 |
| 18 | 10500 | 2150 | 660 | 3.26 | 9500 | 1850 | 625 | 2.96 | 2500 | 600 | 195 | 3.08 |

EXAMPLE 5

A series of drilling fluid compositions were prepared utilizing the following procedure set forth in Table V:

TABLE V

| Preparation of Drilling Fluid Formulation | |
|---|---|
| LVT-200 Oil[1] | 241.5 ml (196 g) |
| Carbotec Emulsifier[2] | 8.5 g |
| Mix 5 minutes, then add | |
| Lime | 5.0 g |
| Mix 5 minutes, then add | |
| 30% solution CaCl$_3$ | 45.5 g (13.7 ml) |
| Mix 5 minutes, then add | |
| Organoclay | 6.0 g |
| Mix 15 minutes, then add | |
| Barium Sulfate | 236.0 g |
| Mix 10 minutes, then add | |
| Carb-mul Emulsifer[3] | 3.0 ml |
| Mix 5 minutes | |
| Total Volume = | 350.0 ml |

[1]Conoco product
[2,3]Surfactant products of Baker Hughes Inteq, Houston, Texas Properties of the resultant drilling fluids were determined by the established procedures recommended by the American Petroleum Institute API RP 13B, Fourth Edition, November, 1972, including yield point (YP), plastic viscosity (PV), and gel strength ("Gels") (determined for a fresh sheared sample at 3 r.p.m., and then after the slurry has gelled for 10 minutes). This data is set forth in Table VI below for four samples of drilling fluids in accordance with the invention (A, B, C, and D) and for a control sample (Control) which was formulated in a manner similar to the test samples except for the use of a conventional organoclay as a viscosity agent. The organoclay used in the control was the Bentone 38 product of Rheox, Inc. which is understood to represent the reaction product of a hectorite with a 100% dimethyl di(hydrogenated tallow) quaternary ammonium salt (referred to in the notes for Table II as "2M2HT"). Details respecting the preparation and compositions of the several samples are set forth following the Table. The first set of the samples in the tabulated data were subjected to evaluation at a temperature of around 150° F.; and the remaining sets to similar evaluation after 16 hours of hot rolling at temperatures of respectively 300°, 350°, 400°, and 450° F.

TABLE VI

Drilling Fluid at 6 lb. Organoclay per Barrel

| Sample | Fann Readings 600/300 | Fann Readings 200/100 | Fann Readings 6/3 | Gel Strength lbs/100 ft | PV cps | YP lbs/100 ft$^2$ |
|---|---|---|---|---|---|---|
| A | 40/23 | — | —/2 | — | 17 | 6 |
| B | 36/20 | — | —/1 | — | 16 | 4 |
| C | 38/21 | — | —/1 | — | 17 | 4 |
| D | 35/20 | — | —/1 | — | 15 | 5 |
| Control | 28/15 | — | —/0 | — | 13 | 2 |
| | | | 300° F. | | | |
| A | 67/38 | 27/15 | 2/1 | 4/6 | 29 | 9 |
| B | 74/46 | 35/21 | 4/3 | 6/10 | 28 | 18 |
| C | 71/44 | 33/20 | 3/2 | 4/10 | 27 | 17 |
| D | 60/36 | 26/15 | 2/1 | 5/8 | 24 | 12 |
| Control | 51/31 | 22/13 | 1/0 | 3/14 | 20 | 11 |
| | | | 350° F. | | | |
| A | 83/50 | 37/22 | 2/1 | 2/8 | 33 | 17 |
| B | 148/102 | 80/54 | 13/10 | 10/24 | 46 | 56 |
| C | 144/99 | 78/52 | 13/10 | 10/26 | 45 | 54 |
| D | 142/100 | 80/54 | 13/10 | 9/23 | 42 | 58 |
| Control | 143/87 | 62/36 | 4/2 | 3/5 | 56 | 31 |
| | | | 400° F. | | | |
| A | 163/102 | 77/48 | 9/7 | 12/24 | 61 | 41 |
| B | 177/123 | 97/66 | 18/14 | 12/22 | 54 | 69 |
| C | 170/118 | 94/64 | 17/13 | 12/23 | 52 | 66 |
| D | 178/124 | 98/67 | 16/12 | 10/19 | 54 | 70 |
| Control | 166/95 | 67/37 | 3/2 | 2/14 | 71 | 24 |
| | | | 450° F. | | | |
| A | 158/96 | 73/45 | 12/10 | 18/32 | 62 | 34 |
| B | 143/92 | 70/45 | 12/10 | 13/25 | 51 | 41 |
| C | 134/86 | 64/40 | 12/11 | 13/23 | 48 | 38 |
| D | 155/104 | 80/54 | 16/14 | 14/29 | 51 | 53 |
| Control | 110/60 | 42/22 | 2/1 | 1/2 | 50 | 10 |

Notes for Table VI

| | LOI | Grind −200 M | Packed Bulk Density lb./ft$^3$ | % 2M2HT | % MBDT | Description |
|---|---|---|---|---|---|---|
| Sample A | 22.6 | 74 | 8.9 | 100 | — | Bead milled and hydrocloned, slurry passed through MG at 4500 psig with 100% Sepiolite |
| Sample B | 22.6 | 56 | 11.4 | 100 | — | Same as above except 80/20 ratio sepiolite/hectorite |
| Sample C | 22.9 | 70 | 10.1 | 75 | 25 | Same as above except 80/20 ratio sepiolite/hectorite |
| Sample D | 22.8 | 60 | 10.6 | 50 | 50 | Same as above except 80/20 ratio sepiolite/hectorite |

LOI = Loss on Ignition
2M2HT = dimethyldi (hydrogenated tallow) ammonium salt
MBDT = methyl benzyl ditallow ammonium salt It will be seen that the test samples B, C and D prepared in accordance with the invention in which the mixed mineral clay reacted to prepare the organoclay is based on a mixture of sepiolite with hectorite, yielded far superior results at the higher temperatures of the test procedures than was obtained with the drilling fluid which is based on a conventional viscosity additive. The Sample A based on 100% sepiolite is a further control, illustrating the superiority of the Samples B, C and D wherein sepiolite is mixed with 20% hectorite before the organoclay is formed.

EXAMPLE 6

Several different thixotropes, including an organoclay in accordance with the invention, were evaluated in an epoxy system. The method of preparation of the test samples was as follows:

Formula 1

Part A

| | |
|---|---|
| Bisphenol A type epoxy, EEW (epoxy equivalent weight) 180–195 | 100 grams |
| Silica flour, 5 micron average | 100 grams |
| Thixotrope | 1 gram |

Add all Epoxy resin to a ½ pint can and secure to dispermat equipment. Use a 30 mm blade on dispermat. Start mixer and add thixotrope. Mix until incorporated then increase speed to 4000 rpm. Add silica flour at 25 gram increments until all is added. Increase speed to 6000 rpm and disperse 3 minutes.

Part B

| | |
|---|---|
| Catalyst: modified amine, EW{H} (equivalent weight per reactive hydrogen) 110 Stir part B into Part A. | 58 grams |

The thixotropes used in this system were the invention sample (prepared as mineral sample 16 of Example 4 except reacted at 45 meq instead of 55, with 2 passes through an MG at 210,930 g/cm$^3$ for both the sepiolite and hectorite slurries and dried in a fluid bed dryer), fumed silica and a conventional organoclay product (which consists predominately of a montmorillonite clay and a methyl benzyl di(hydrogenated tallow) quaternary ammonium salt) broadly used in solvent based systems. The viscosities of the thixed resins were extremely thick for all three thixotropes. After the catalyst was added, the Brookfield viscosities were measured. Next drawdowns were made and stored vertically for sag measurements. The sag measurement procedure used is that of ASTM D4400. The system with the conventional organoclay lost the most viscosity and became newtonion in flow behavior. The systems with the Invention Sample and fumed silica were thixotropic and had equal viscosities. The sag was much better with Invention Sample than the others. See Table VII and the drawdowns shown in the photographs of FIGS. 1 through 3.

TABLE VII

Formula 1

Brookfield Viscosity

Figure 1:
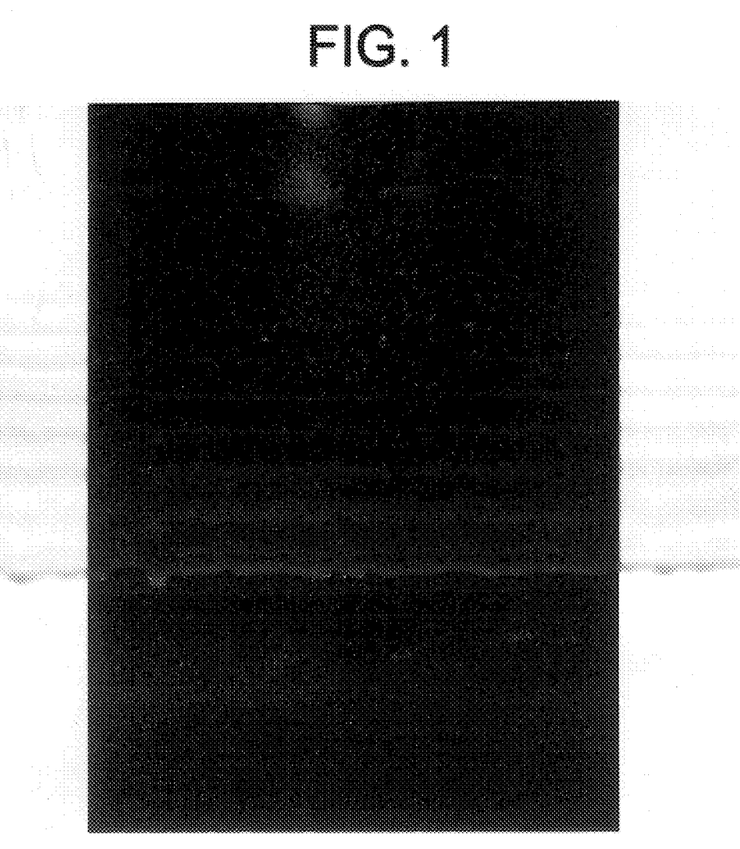
FIGS. 1 through 5 are photographs showing sag results for thixotropic samples in accordance with the invention compared to conventional thixotropes.
Figure 2:
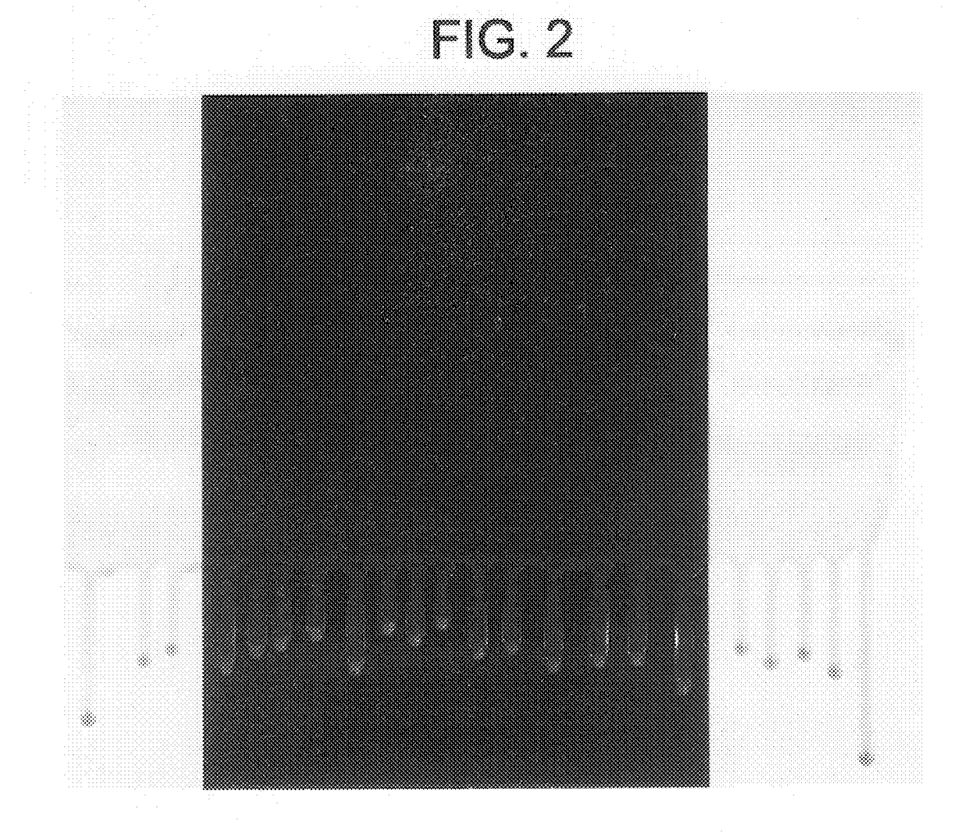
Figure 3:
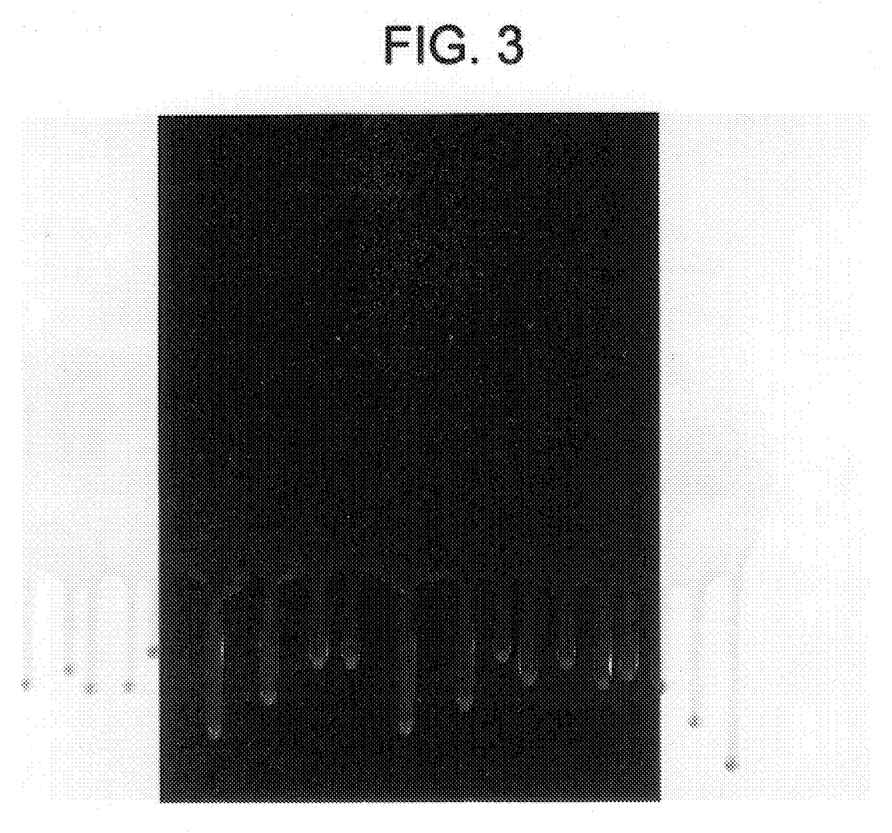

| Thixotrope | cps @ 1 rpm | cps @ 10 rpm | cps @ 100 rpm | Sag | Test Result |
|---|---|---|---|---|---|
| Invention Sample | 15000 | 10000 | 7900 | 12 | FIG. 1 |
| Fumed Silica | 15000 | 10500 | 7950 | 8 | FIG. 2 |
| Conventional Organoclay | 6000 | 6000 | 6100 | 4 | FIG. 3 |

EXAMPLE 7

Further thixotropes, including an organoclay in accordance with the invention, were evaluated in a further epoxy system. The preparation of the test samples was as follows:

Formula 2

Part A

| | |
|---|---|
| Bisphenol A type epoxy, EEW (epoxy equivalent weight) 180–195 | 120 grams |
| Thixotrope | 1.2 gram |
| Glass fiber | 80 grams |

Add all Epoxy resin to a ½ pint can and secure to the dispermat equipment. Use a 30 mm blade on dispermat. Start mixer and add thixotrope. Mix until incorporated then increase speed to 3000 rpm. Add silica flour at 20 gram increments until all is added. Disperse for 3 minutes.

Part B

| | |
|---|---|
| Catalyst: diethylenetriamine Stir Part B into Part A. | 12 grams |

The Invention Sample and fumed silica were the thixotropes used in this Example. The viscosities of the thixed resins (Part A) were extremely thick for both thixotropes. After the addition of the catalyst, the Brookfield viscosities were measured. Next drawdowns were made and stored vertically for sag measurements. The Invention Sample was significantly better than fumed silica in this system at same level based on viscosity and sag. The results are given in Table VIII below, and in the drawdowns of FIGS. 4 and 5.

TABLE VIII

Formula 2

Brookfield Viscosity

Figure 4:
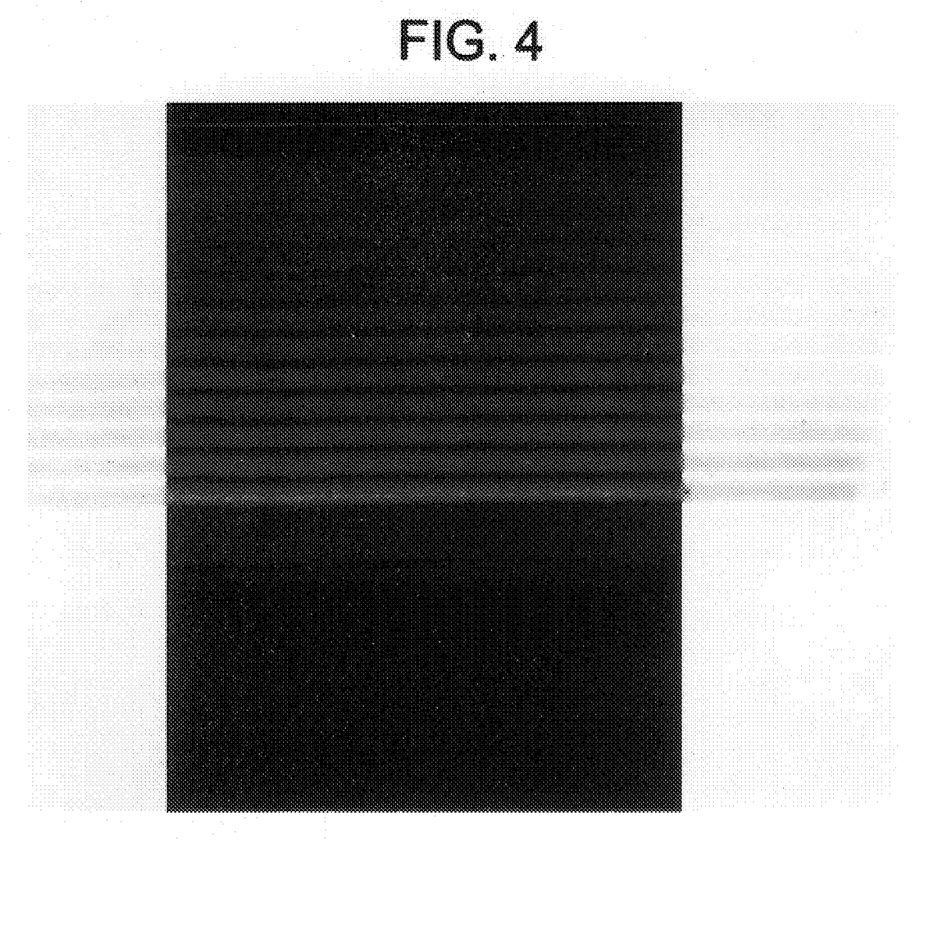
Figure 5:
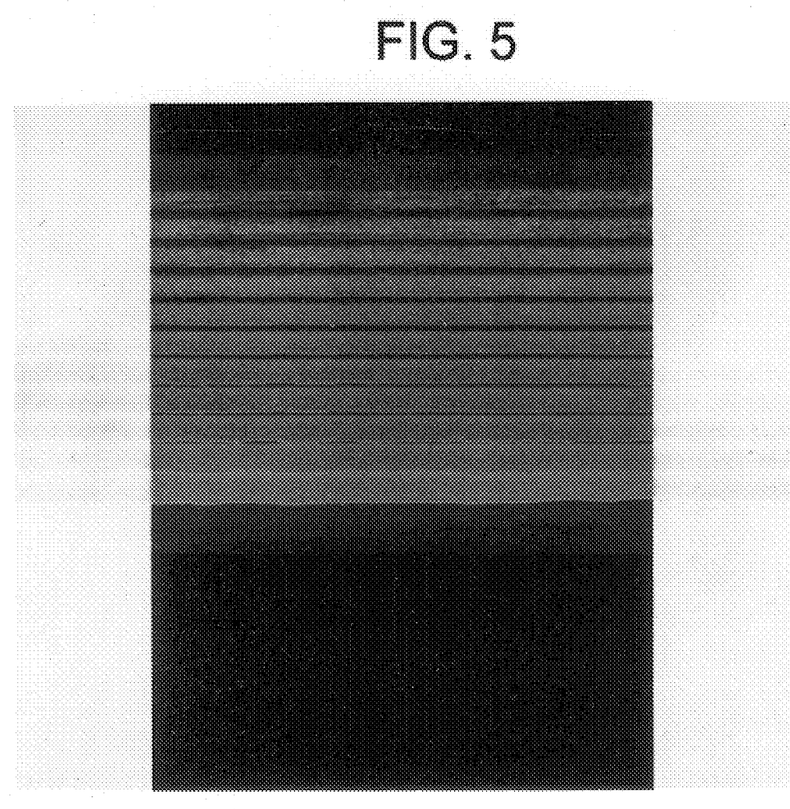

| Thixotrope | cps @ 1 rpm | cps @ 10 rpm | cps @ 100 rpm | Sag | Test Result |
|---|---|---|---|---|---|
| Invention Sample | 125000 | 25500 | 9500 | 60+ | FIG. 4 |
| Fumed Silica | 60000 | 16000 | 8300 | 45 | FIG. 5 |

EXAMPLE 8

Further thixotropes, including an organoclay in accordance with the invention, were evaluated in a further epoxy system. The preparation of the test samples was as follows:

Formula 3

Part A

| | |
|---|---|
| Bisphenol A type epoxy EEW (epoxy equivalent weight) 180–195 | 100 grams |
| Silica flour, 5 micron average | 100 grams |
| Thixotrope | 1 gram |

Add all Epoxy resin to a ½ pint can and secure to dispermat equipment. Use a 30 mm blade on dispermat. Start mixer and add thixotrope. Mix until incorporated then increase speed to 4000 rpm. Add silica flour at 25 gram increments until all is added. Increase speed to 6000 rpm and disperse 3 minutes.

Part B

| | |
|---|---|
| Catalyst: Diethylenetriamine Stir Part B into Part A. | 10 grams |

Figure 6:
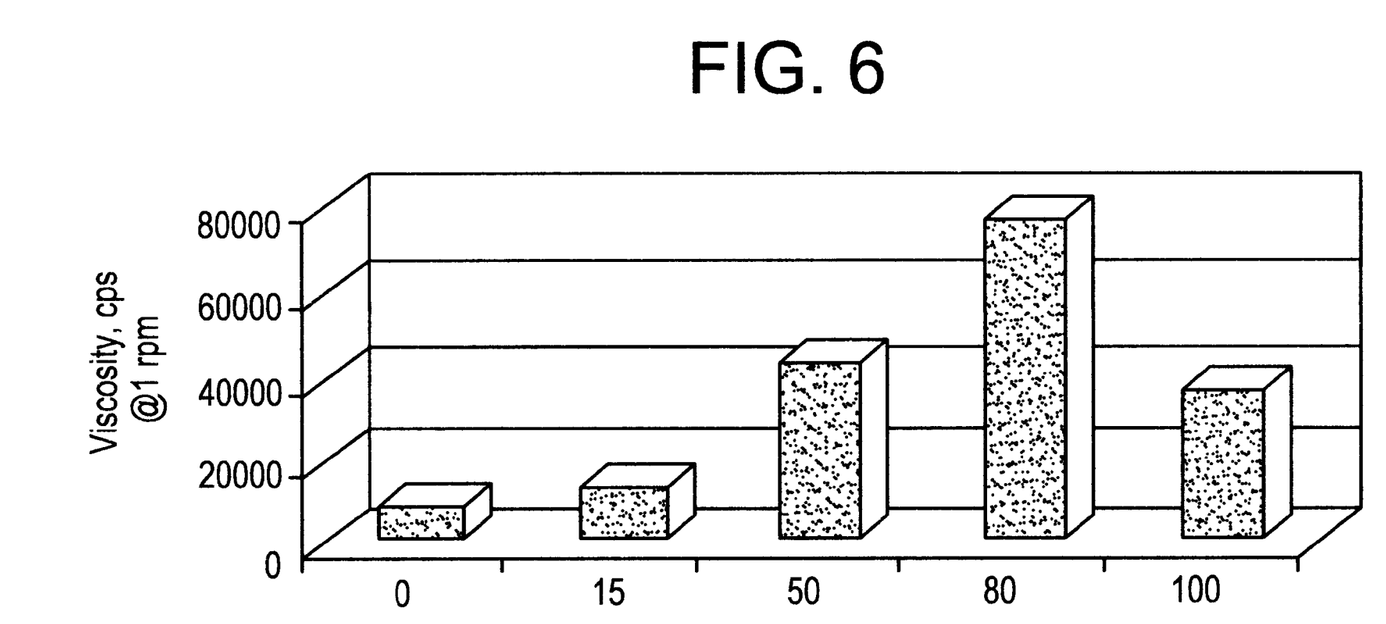
FIGS. 6 and 7 are bar graphs showing the effects of sepiolite to hectorite ratios on the thixotropic qualities of organoclay samples according to the invention.
Figure 7:
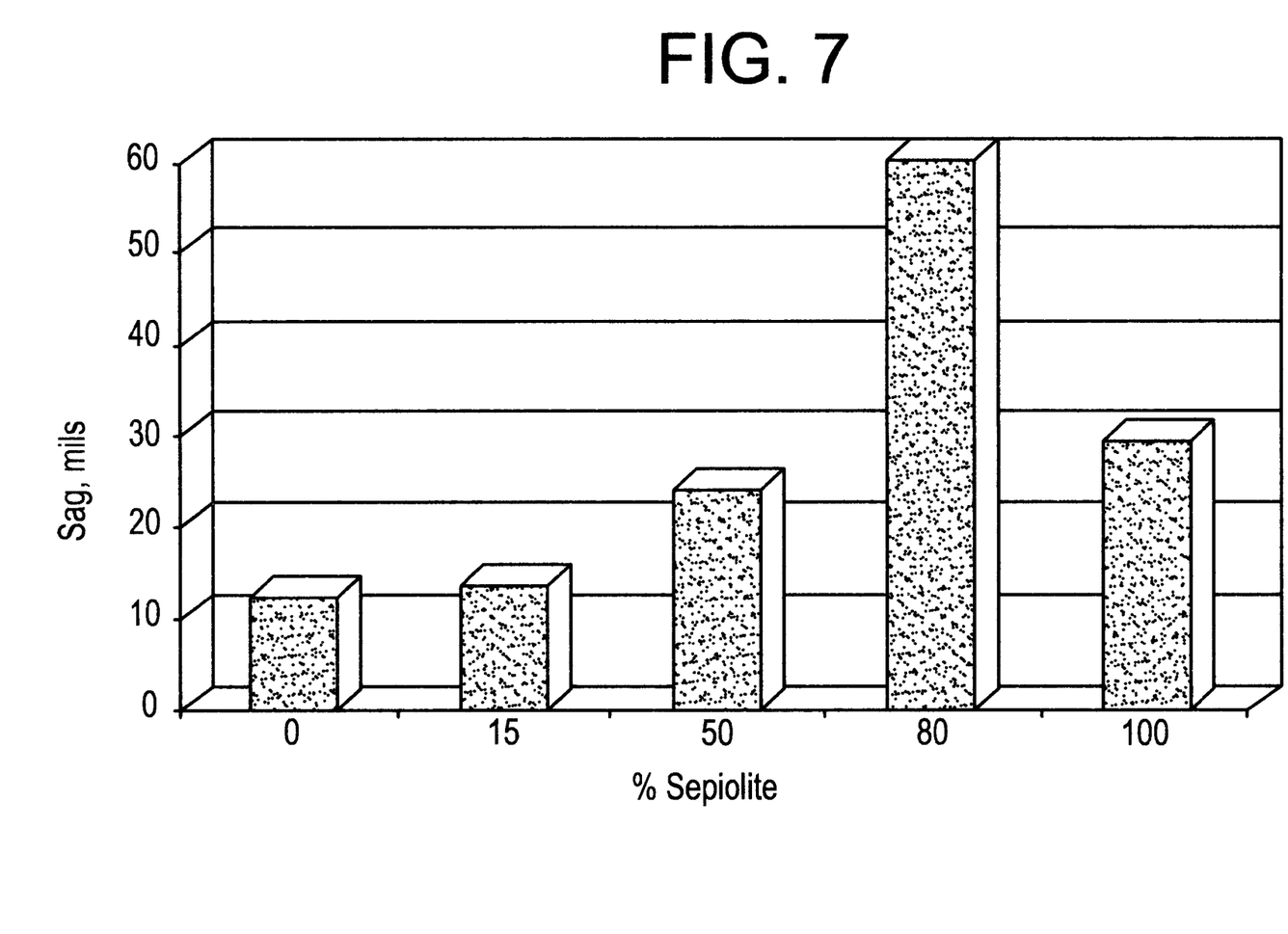

The data in Table IX demonstrates the significance of the blend of sepiolite and hectorite (or saponite) over either mineral alone or the traditional material used in Epoxy resin systems. The results of a ladder study are given in Table IX. The MER was decreased as the level of sepiolite increased because the cation exchange capacity of sepiolite is much lower than hectorite. In FIGS. 6 and 7 the 1 rpm Brookfield viscosity and sag data of Table IX are plotted as a function of % sepiolite. The sharp peaking of the curve at about the 80% sepiolite level is evident.

TABLE IX

| Sample ID | Sepiolite % | MER meq/100 g | Sag mil | Brookfield Viscosity, cps | | |
|---|---|---|---|---|---|---|
| | | | | 1 rpm | 10 rpm | 100 rpm |
| EXP. 1 | 0 | 111 | 12 | 10,000 | 8,000 | 6,800 |
| EXP. 2 | 15 | 75 | 14 | 15,000 | 9,000 | 6,200 |
| EXP. 3 | 50 | 65 | 24 | 45,000 | 15,000 | 8,000 |
| EXP. 4 | 80 | 45 | 60+ | 80,000 | 20,500 | 8,900 |
| EXP. 5 | 80 | 55 | 60 | 80,000 | 20,000 | 8,600 |
| EXP. 6 | 100 | 45 | 30 | 40,000 | 15,000 | 7,950 |
| Fumed Silica (FS) | NA | NA | 25 | 60,000 | 19,000 | 9,000 |
| Treated FS | NA | NA | 12 | 10,000 | 6,000 | 5,950 |
| Saponite | 80 | 45 | 50 | 80,000 | 20,000 | 8,550 |

EXAMPLE 9

An organoclay sample corresponding to the Invention Sample was used at dosage of 5.6 weight % in preparation of a nanocomposite based on Nylon 6,6. The nanocomposite was prepared by mixing the organoclay with Nylon using conventional compounding equipment for blending the polymer and additives. The process temperature should be at least as high as the melting point of the polyamide employed and below the degradation temperature of the polyamide and of the organic treatment of the silicate. Optionally, an additional processing step can be added, such as solid state polymerization. The process to form the nanocomposite is preferably carried out in the absence of air, as for example in the presence of an inert gas.

The resulting nanocomposite displayed a tensile strength of 13.7 kpsi (11.4 without the organoclay), a tensile modulus of 596 kpsi (455 without the organoclay), and a flex modules of 578 kpsi (450 without the organoclay), all of which are excellent values for such a material.

While the present invention has been described in terms of specific embodiments thereof, it will be understood in view of the present disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

What is claimed is:

1. An organoclay composition comprising a mineral clay mixture which has been treated with an alkyl quaternary ammonium salt, said mixture comprising a dilute aqueous slurry of:
   mineral clay (a) comprising 50 to 95 wt. %, based on the weight of the mineral clay mixture, of a mineral clay selected from the group consisting of sepiolite palygorskite and mixtures of sepiolite and palygorskite; and
   mineral clay (b) comprising the balance by weight of the mineral clay mixture, of a smectite.

2. The organoclay composition of claim 1 wherein mineral clay (a) is present in an amount of 60 to 95 wt. %, based on the weight of the mineral clay mixture.

3. The organoclay composition of claim 1, wherein mineral clay (a) is present in an amount of 70 to 90 wt. %, based on the weight of the mineral clay mixture.

4. The organoclay composition of claim 1, wherein the smectite is selected from the group consisting of hectorite, montmorillonite, bentonite, beidelite, saponite, stevensite and mixtures thereof.

5. The organoclay composition of claim 4, wherein the smectite comprises hectorite.

6. The organoclay composition of claim 1 wherein the alkyl quaternary ammonium salt contains the same or different straight- and/or branched-chain saturated and/or unsaturated alkyl groups of 1 to 22 carbon atoms and the salt moiety is selected from the group consisting of chloride, bromide, methylsulfate, nitrate, hydroxide, acetate, phosphate and mixtures thereof.

7. The organoclay composition of claim 6, wherein the alkyl quaternary ammonium salt is selected from the group consisting of dimethyl di(hydrogenated tallow) ammonium chloride, methylbenzyl di(hydrogenated tallow) ammonium chloride, dimethylbenzyl hydrogenated tallow ammonium chloride, dimethyl hydrogenated tallow-2-ethylhexylammonium methylsulfate and mixtures thereof.

8. The organoclay composition of claim 1, wherein the mineral clay mixture is treated with about 5 to 80 meq. of the alkyl quaternary ammonium salt per 100 g of the mineral clay mixture.

9. The organoclay composition of claim 7, wherein the mineral clay mixture is treated with 35 to 65 meq. of the alkyl quaternary ammonium salt per 100 g of the mineral clay mixture.

10. A method for producing an organoclay composition for use as a functional additive with organic compositions; said method comprising:
    subjecting both a mineral clay (a) and a mineral clay (b) to high shear as dilute aqueous slurries; and thereupon reacting an aqueous mixture of the sheared mineral clays with an alkyl quaternary ammonium compound;
    said mineral clay (a) comprising 50 to 95 wt. %, based on the weight of the mineral clay mixture, of a mineral clay selected from the group consisting of sepiolite, palygorskite and mixtures of sepiolite and palygorskite; and
    said mineral clay (b) comprising the balance by weight of the mineral clay mixture, of a smectite; and
    dewatering the resulting organoclay product.

11. The method of claim 10, wherein the aqueous slurry of clay (a) and of clay (b) is subjected to fluid shear by passing the slurry through a narrow gap, across which a pressure differential is maintained.

12. The method of claim 10, wherein mineral clay (a) is present in an amount of 60 to 95 wt. %, based on the weight of the mineral clay mixture.

13. The method of claim 10, wherein mineral clay (a) is present in an amount of 70 to 90 wt. %, based on the weight of the mineral clay mixture.

14. The method of claim 12, wherein the smectite is selected from the group consisting of hectorite, montmorillonite, bentonite, beidelite, saponite, stevensite and mixtures thereof.

15. The method of claim 14, wherein the smectite comprises hectorite.

16. The method of claim 10, wherein the alkyl quaternary ammonium compound is a salt which contains the same or different straight- and/or branched-chain saturated and/or unsaturated alkyl groups of 1 to 22 carbon atoms and the salt moiety is selected from the group consisting of chloride, bromide, methylsulfate, nitrate, hydroxide, acetate, phosphate and mixtures thereof.

17. The method of claim 16, wherein the alkyl quaternary ammonium salt is selected from the group consisting of dimethyl di(hydrogenated tallow) ammonium chloride, methylbenzyl di(hydrogenated tallow) ammonium chloride, dimethylbenzyl hydrogenated tallow ammonium chloride, dimethyl hydrogenated tallow-2-ethylhexylammonium methylsulfate and mixtures thereof.

18. The method of claim 10, wherein the mineral clay mixture is treated with about 5 to 80 meq. of the alkyl quaternary ammonium compound per 100 g of the mineral clay mixture.

19. The method of claim 18, wherein the mineral clay mixture is treated with 35 to 65 meq. of the alkyl quaternary ammonium compound per 100 g of the mineral clay mixture.

* * * * *

UNITED STATES PATENT AND TRADEMARK OFFICE
CERTIFICATE OF CORRECTION

PATENT NO : 6,036,765
DATED : March 14, 2000
INVENTOR(S): Farrow et al.

It is certified that error appears in the above-identified patent and that said Letters Patent is hereby corrected as shown below:

On Column 8, line 57 please change "Theological enhancers" to read --rheological enhancers--.

Signed and Sealed this

Sixth Day of March, 2001

*Attest:*

NICHOLAS P. GODICI

*Attesting Officer*  *Acting Director of the United States Patent and Trademark Office*